(12) United States Patent
Castell Martinez et al.

(10) Patent No.: US 8,476,779 B2
(45) Date of Patent: Jul. 2, 2013

(54) METHOD OF REDUCING TORSIONAL OSCILLATIONS IN THE POWER TRAIN OF A WIND TURBINE

(75) Inventors: Daniel Castell Martinez, Barcelona (ES); Carlos Casanovas Bermejo, Barcelona (ES)

(73) Assignee: Alstom Wind S.L., Barcelona (ES)

( * ) Notice: Subject to any disclaimer, the term of this patent is extended or adjusted under 35 U.S.C. 154(b) by 440 days.

(21) Appl. No.: 12/990,835

(22) PCT Filed: May 12, 2009

(86) PCT No.: PCT/EP2009/055736
§ 371 (c)(1),
(2), (4) Date: Nov. 3, 2010

(87) PCT Pub. No.: WO2009/138409
PCT Pub. Date: Nov. 19, 2009

(65) Prior Publication Data
US 2011/0049890 A1 Mar. 3, 2011

(30) Foreign Application Priority Data
May 14, 2008 (EP) ..................................... 08156209

(51) Int. Cl.
*F03D 9/00* (2006.01)
*H02P 9/04* (2006.01)
*H02K 11/00* (2006.01)

(52) U.S. Cl.
USPC ................................. 290/44; 290/55; 322/58

(58) Field of Classification Search
USPC .......................................... 290/44, 55; 322/58
See application file for complete search history.

(56) References Cited

U.S. PATENT DOCUMENTS

| 4,080,559 | A | * | 3/1978 | Wright et al. | 322/58 |
|---|---|---|---|---|---|
| 4,282,756 | A | * | 8/1981 | Molnar et al. | 73/650 |
| 4,311,253 | A | * | 1/1982 | Putman et al. | 322/25 |
| 4,326,158 | A | * | 4/1982 | Helgesen | 322/4 |
| 4,329,637 | A | * | 5/1982 | Kotake et al. | 322/20 |
| 4,377,780 | A | * | 3/1983 | Bjorklund | 322/29 |
| 4,384,246 | A | * | 5/1983 | Larsen et al. | 322/58 |
| 4,454,428 | A | * | 6/1984 | Kimmel et al. | 290/40 R |
| 6,254,197 | B1 | | 7/2001 | Lading et al. | |
| 7,173,399 | B2 | * | 2/2007 | Sihler et al. | 322/40 |
| 7,423,411 | B2 | * | 9/2008 | Sihler | 322/19 |
| 7,518,344 | B2 | * | 4/2009 | Sihler | 322/58 |
| 7,717,013 | B2 | * | 5/2010 | Hildebrand et al. | 74/574.2 |
| 2006/0232250 | A1 | * | 10/2006 | Sihler et al. | 322/58 |

(Continued)

FOREIGN PATENT DOCUMENTS

| DE | 19705948 | 8/1998 |
|---|---|---|
| DE | 102006001613 | 7/2007 |

(Continued)

OTHER PUBLICATIONS

International Search Report and Written Opinion PCT/EP2009/055736 of Sep. 9, 2009.

*Primary Examiner* — Pedro J Cuevas
(74) *Attorney, Agent, or Firm* — Squire Sanders (US) LLP

(57) ABSTRACT

The present invention refers to a method of reducing torsional oscillations in the power train of a wind turbine in the event of grid loss. According to the method, after the grid loss, a braking torque is applied to the power train during a period of time and said period of time is determined as a function of the torsional resonance frequency of the power train.

15 Claims, 4 Drawing Sheets

U.S. PATENT DOCUMENTS

Figure 1:
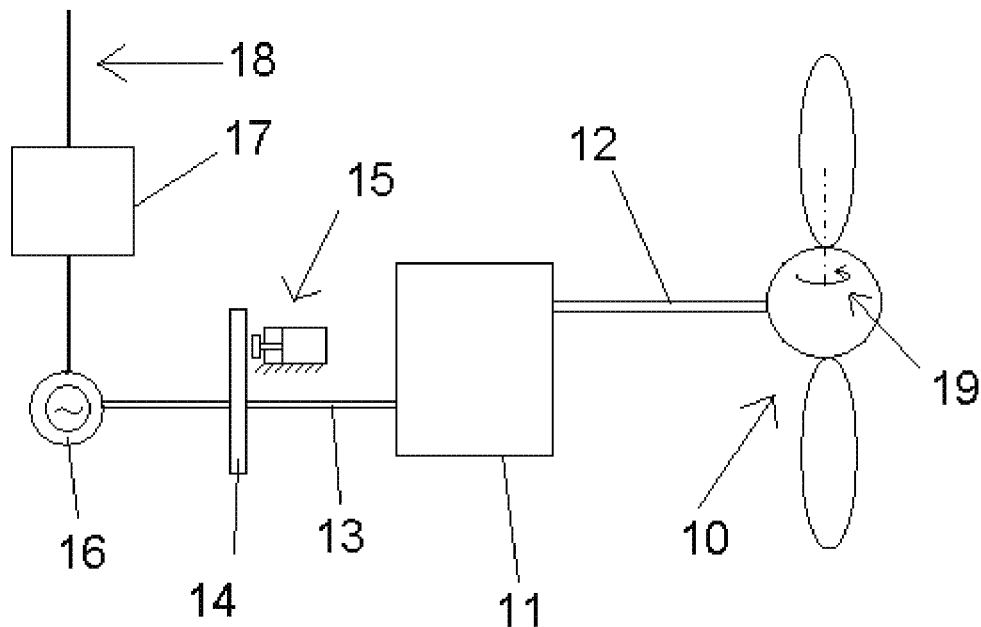

| | | | |
|---|---|---|---|
| 2006/0244425 A1* | 11/2006 | Sihler | 322/58 |
| 2007/0279012 A1* | 12/2007 | Sihler | 322/20 |
| 2009/0295161 A1 | 12/2009 | Steiner et al. | |
| 2010/0094480 A1* | 4/2010 | Angquist et al. | 700/298 |
| 2012/0299305 A1* | 11/2012 | Brogan et al. | 290/55 |
| 2013/0027994 A1* | 1/2013 | Nelson et al. | 363/40 |

FOREIGN PATENT DOCUMENTS

| | | |
|---|---|---|
| WO | 03040556 | 5/2003 |
| WO | 2004098968 | 11/2004 |
| WO | 2007082642 | 7/2007 |
| WO | 2007140787 | 12/2007 |

* cited by examiner

METHOD OF REDUCING TORSIONAL OSCILLATIONS IN THE POWER TRAIN OF A WIND TURBINE

CROSS-REFERENCE TO RELATED APPLICATIONS

The present Application is a U.S. National Phase of PCT/EP2009/055736 of CASTELL MARTINEZ Daniel et al. entitled "Method of reducing torsional oscillations in the power train of a wind turbine", filed on May 12, 2009 ("the PCT Application"). The PCT Application claims benefit of priority to European Application Serial No. 08156209.2 filed on May 14, 2008, the entire contents of the PCT and the EP applications are hereby incorporated by reference herein.

The present invention relates to a method of control of a wind turbine. More precisely, it relates to a method of control of a wind turbine in the case of grid loss.

Modern wind turbines are commonly used to supply electricity into the electrical grid. Wind turbines of this kind generally comprise a rotor with a plurality of blades. The rotor with the blades is set into rotation under the influence of the wind on the blades. The rotation of the rotor shaft either directly drives the generator rotor ("directly driven") or through the use of a gearbox.

During normal operation, the rotational speed of the wind turbine is controlled by the magnetic torque acting on the generator and the aerodynamic torque acting on the rotor. Additionally, braking systems are usually foreseen.

Various ways to control the aerodynamic torque acting on the rotor of wind turbines are known. In "pitch-regulated" wind turbines, the rotor blades can be rotated around their longitudinal axis to control the angle of attack of the wind on the blades. In "passive-stall" regulated wind turbines, stall automatically occurs on the blades when the wind speed increases above a predetermined wind speed. The aerodynamic torque is hereby limited.

The braking systems generally act mechanically on the low speed shaft or on the high speed shaft. Also braking systems that act electrically on the generator are known. In pitch-regulated wind turbines, pitching of the blades to their feathering position is used to slow down the wind turbine. The (mechanical) brake is only used to come to a complete stop of the wind turbine, or to keep the turbine in its park-position.

As mentioned before, during normal operation, the rotational speed of the wind turbine is controlled by amongst others the magnetic torque acting on the generator. The components of the power train (rotor shaft or slow speed shaft, gearbox, high speed shaft, generator) elastically deform under the influence of the aerodynamic torque acting on the rotor and the magnetic torque acting on the generator. Potential energy is stored in this elastic deformation. When a grid loss occurs, the magnetic torque at the generator is very suddenly lost, and the potential energy of the power train is converted into kinetic energy. As a result, the power train suffers from torsional oscillations. These oscillations can be very damaging to especially the gearbox and can significantly reduce its lifetime.

In the prior art, various methods of dealing with grid loss and of reducing torsional oscillations are known. WO 2007/082642 describes a method of dealing with grid loss by reducing the pitch angle of the rotor blades, followed by applying a mechanical brake on the high speed shaft. WO 2004/098968 describes a method of braking in the case of a grid failure. The braking device acts on the high speed shaft. The hydraulic pressure of the brake is controlled until the wind turbine comes to a complete stop. The device and its control method are especially adapted to be used in "stall-regulated" wind turbines. WO 03/040556 describes a method of slowing down the wind turbine aimed at avoiding torsional oscillations. In the method, the deceleration torque of the brake is regulated in a predetermined time sequence, based on the natural frequency of the wind energy converter. U.S. Pat. No. 6,254,197 describes an alternative hydraulic braking system and a method of controlling it. A particular method described prescribes to first apply aerodynamic brakes (movable tips of the blades) and after a period of 15 seconds apply the mechanical brake.

The prior art methods are complicated and therefore expensive. Besides, they have not always yielded satisfactory results. So, there exists a need for an improved method of control of a wind turbine in the case of grid loss, which is reliable and easily applicable to present-day wind turbines.

The present invention aims at achieving this goal. The goal is achieved by a method according to claim 1. Further advantageous embodiments are described in the dependent claims.

In the case of grid loss, a braking torque is applied to the power train during a period of time, said period of time being determined as a function of the torsional resonance frequency of the power train. The power train of the wind turbine has a torsional resonance frequency that is unique for each power train and thus for each type of wind turbine. Upon grid loss, the magnetic torque of the generator disappears and the power train will start to oscillate with a frequency that is its torsional resonance frequency. In determining the period of braking, this frequency should therefore be taken in into account. The way to put the invention into practice is thus to determine the resonance frequency of the power train, to determine (to calculate) the desired braking period as a function of this resonance frequency and after grid loss, apply the brake during the determined braking period.

Preferably, said period of time is also determined as a function of the delay occurring between the moment of grid loss and the moment of applying the braking torque. To obtain optimum results of reducing torsional oscillations, the brake should only be activated in the period immediately following the grid loss in which the torque of the slow speed shaft is decreasing, i.e. the period in which the power train is "unwinding". Applying the brake when the torque in the slow speed shaft is increasing could have the result of increasing the torsional oscillations. Therefore, preferably also the delay occurring between the moment of grid loss and the moment of applying the braking torque is taken into account to determine the period of braking. According to this preferred method, the way to put the invention into practice is thus to determine the resonance frequency of the power train, to determine the delay occurring between the moment of grid loss and the moment of applying the braking torque, then to determine (to calculate) the desired braking period as a function of these two parameters and after grid loss, apply the brake during the determined braking period.

Preferably, the brake is activated substantially immediately after grid loss is detected.

Any braking system may be used in the method according to the invention and each braking system will has an inherent minimum reaction time. The sooner the braking system reacts to the grid loss, the longer the braking torque can be applied while the power train is still unwinding.

Preferably, said period of time is determined to be between 50% and 100% of a maximum allowable period, said maximum allowable period being determined as half the torsional resonance period of the power train minus the delay between the moment of grid loss and the moment of applying the braking torque.

More preferably, said period of time is determined to be between 70% and 100%, and most preferably between 80% and 100% of said maximum allowable period.

In other words, said period of time is ideally chosen to be just less than half the torsional resonance period of the power train minus the delay occurring between the moment of grid loss and the moment of applying the braking torque, i.e. the maximum period of braking is determined to be according to the following formula:

$$t_{max\_brake} = 0.5 \cdot t_{resonance\_period\_power\_train} - t_{delay}$$

As mentioned before, to obtain optimum results of reducing torsional oscillations, the brake should only be activated in the period immediately following the grid loss in which the torque of the slow speed shaft is decreasing, i.e. the period in which the power train is "unwinding". The power train is unwinding during the first half of the first torsional oscillation period. Ideally, the brake should be activated during this entire time. However, no braking system can react without delay. Therefore, this delay (the time between the moment of grid loss and the moment of applying the braking torque) should be deducted from this half oscillation period to determine the maximum braking period. The formula thus gives the maximum braking period. The brake is ideally applied as long as possible (to have its maximum effect), within this maximum braking period.

Preferably, the period of braking is approximately 0.4 seconds. It has been found that a braking period of approximately 0.4 seconds is sufficiently long for significantly reducing the torsional oscillations and at the same time is so short that the torque of the slow speed shaft is still decreasing.

Preferably, the braking torque is applied during a single short period of time. After the brake has been deactivated, it is not necessary to reactivate the brake to further reduce torsional oscillations.

Preferably, the braking torque that is applied by the brake is determined taking the wind speed at the moment of grid loss into account. More preferably, the braking torque is determined taking the aerodynamic torque acting on the rotor into account. Alternatively, the braking torque is determined taking the electrical power generated by the generator at the moment of grid loss into account. The most advantageous results are not necessarily achieved by applying the greatest available braking torque. Rather an optimum braking torque to be used in the method exists.

During operation of a wind turbine, prevailing wind speeds are usually measured. Therefore, a way to determine the optimum braking torque is to take the wind speed at the moment of grid loss into account.

A more precise way of determining the optimum braking torque takes the aerodynamic torque at the moment of grid loss into account. The aerodynamic torque at that moment not only depends on the wind speed, but also e.g. on the pitch angle of the blades. More preferably, the optimum braking torque is determined taking the period of braking, the delay occurring between the moment of grid loss and the moment of applying the braking torque, and the aerodynamic torque at the moment of grid into account. This can be expressed using the following formula:

$$M_{brake.opt} = \kappa \cdot M_{aero}$$

In this formula, $M_{brake\_opt}$ is the optimum braking torque and $M_{aero}$ is the aerodynamic torque on the rotor at the moment of grid loss. $\kappa$ is a coefficient that is determined for each wind turbine type according to the period of braking, and the delay occurring between the moment of grid loss and the moment of applying the braking torque. $\kappa$ will thus have a unique value for each wind turbine type.

A complication is that wind turbines generally do not comprise a system for measuring the aerodynamic torque directly. To overcome this complication, the electrical power is measured and the aerodynamic torque can then be determined using the following formula:

$$M_{aero\_HSS} = \frac{P_{electr}}{\omega_{HSS}}$$

In this formula, $M_{aero\_HSS}$ is the (aerodynamic) torque in the high speed shaft, $P_{electr}$ is the electric power generated by the generator at the moment of grid loss and $\omega_{HSS}$ is the rotational velocity of the high speed shaft. The formula gives a very good estimate of the aerodynamic torque. Therefore, using the electric power generated by the generator at the moment of grid loss (which is anyway measured in present day wind turbines) is a good way to determine the optimum braking torque.

In conclusion, the optimum braking torque can be determined using the aerodynamic torque acting on the rotor at the moment of grid loss into account. An intermediate step in this method can be the estimate of the aerodynamic torque using the above formula. Alternatively, the optimum braking torque is directly determined through the measure of the electric power generated by the generator at the moment of grid loss.

Optionally, the brake is only activated if grid loss occurs at a moment of high wind speeds. The complexity of the system is thereby reduced, leading to further cost reduction. This option is especially preferable if it is determined that the effect of torsional oscillations at low wind speeds does not lead to unacceptable damage.

Another option is to apply the method of braking whenever grid loss occurs, independent of the wind speed. The system will be more complex, since a more complex control algorithm will be needed. However, torsional oscillations can advantageously be reduced in any situation of grid loss.

Preferably, a pitch system is provided in the wind turbine and the pitch system is also activated substantially immediately following grid loss, so that after the brake has been released, pitch control of the rotor blades is used to further slow down the wind turbine. The mechanical brake acts more directly on the power train than the pitch system. The mechanical brake is thus more suitable for reducing torsional oscillations immediately. After releasing the brake, only the pitch system is needed to further slow down the wind turbine. In the case of grid loss, both systems are activated. The combination of the mechanical brake and pitching of the blades significantly reduces the torsional oscillations and can guarantee proper shutdown of the wind turbine. The brake is only used again to come to a final complete stop of the wind turbine, or to keep the turbine in its park-position.

Any kind of brake can in principle be used in the method. Advantageously, the brake, that is present for bringing the wind turbine to a complete shut-down, is also used in the method of braking in the case of grid-loss according to the invention. No separate brake needs to be provided.

In principle, any form of actuating mechanism (hydraulic, electrical etc.) can be used for the braking system. However, the system needs to be operational in the case of grid loss. This means that the system should be able to work in the absence of electricity supply from the grid. A battery in the case of an electrical braking system can be foreseen. For a wind turbine comprising a hydraulic brake, a reservoir of hydraulic fluid may be foreseen.

Further possible embodiments of the invention and their advantages will be explained with reference to the figures. The figures show in:

FIG. 1 a wind turbine with a braking system in which the method according to the invention can be applied.

Figure 2:
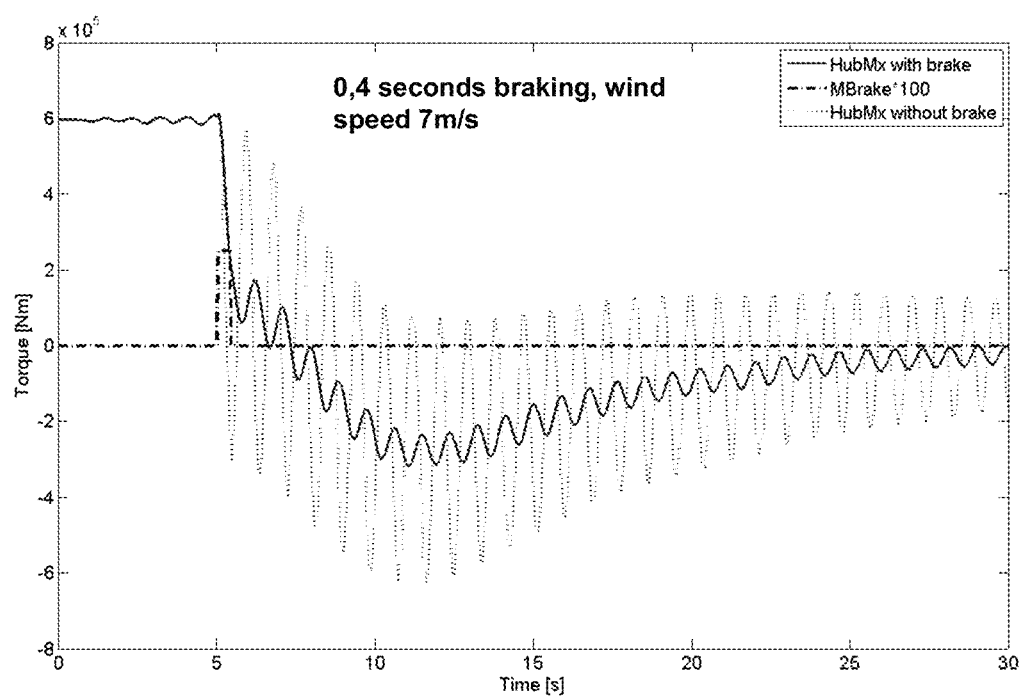

FIG. 2 a simulation of torsional oscillations in the rotor shaft after grid loss at a wind speed of 7 m/s.

Figure 3:
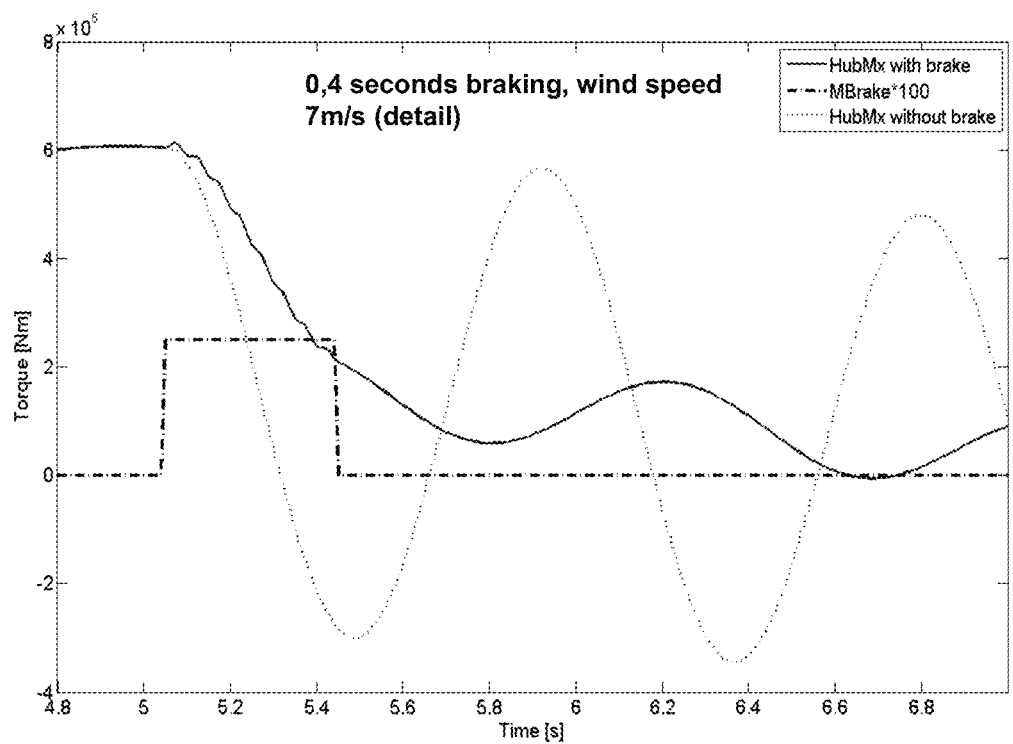

FIG. 3 a more detailed view of the two seconds after grid loss of FIG. 2

Figure 4:
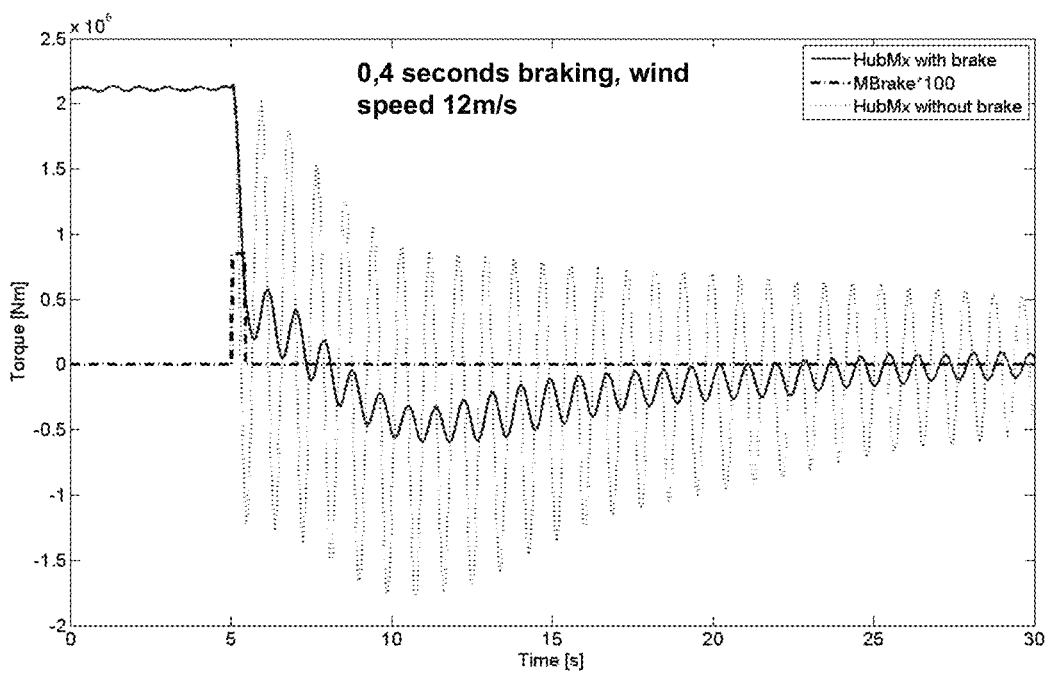

FIG. 4 simulation of torsional oscillations in the rotor shaft after grid loss at a wind speed of 12 m/s.

Figure 5:
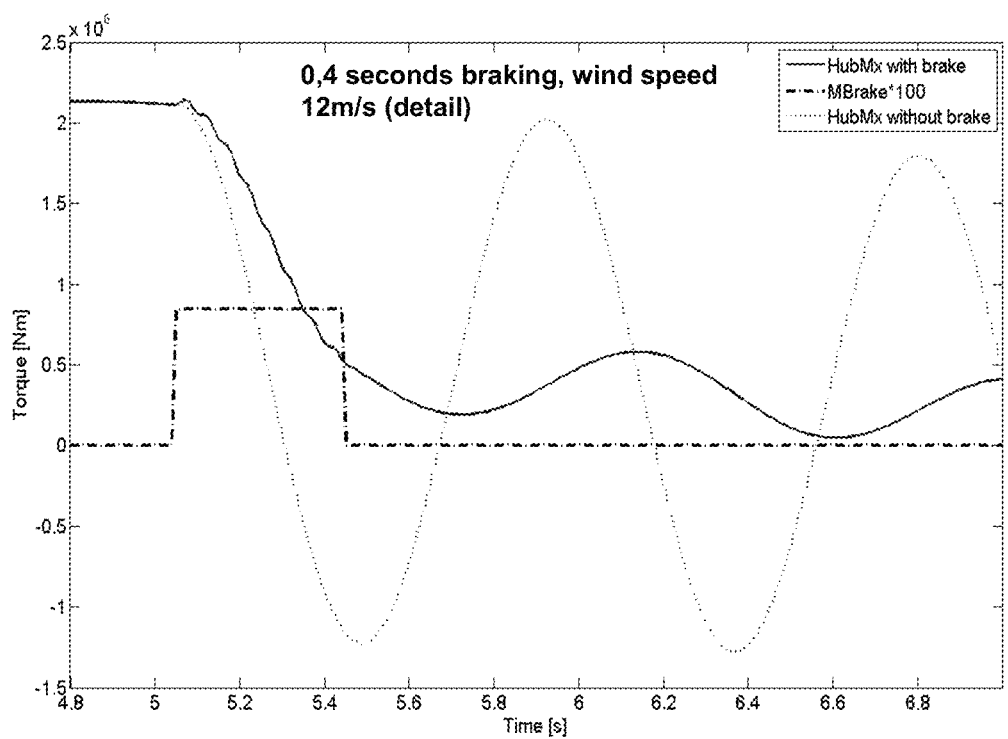

FIG. 5 more detailed view of the two seconds after grid loss of FIG. 4

Figure 6:
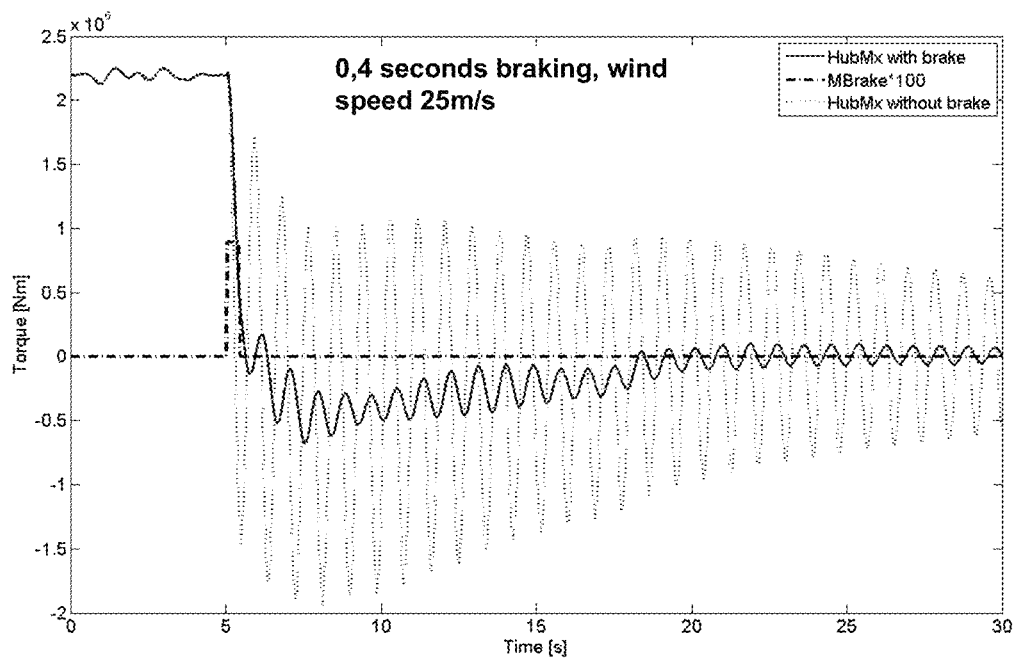

FIG. 6 simulation of torsional oscillations in the rotor shaft after grid loss at a wind speed of 25 m/s.

Figure 7:
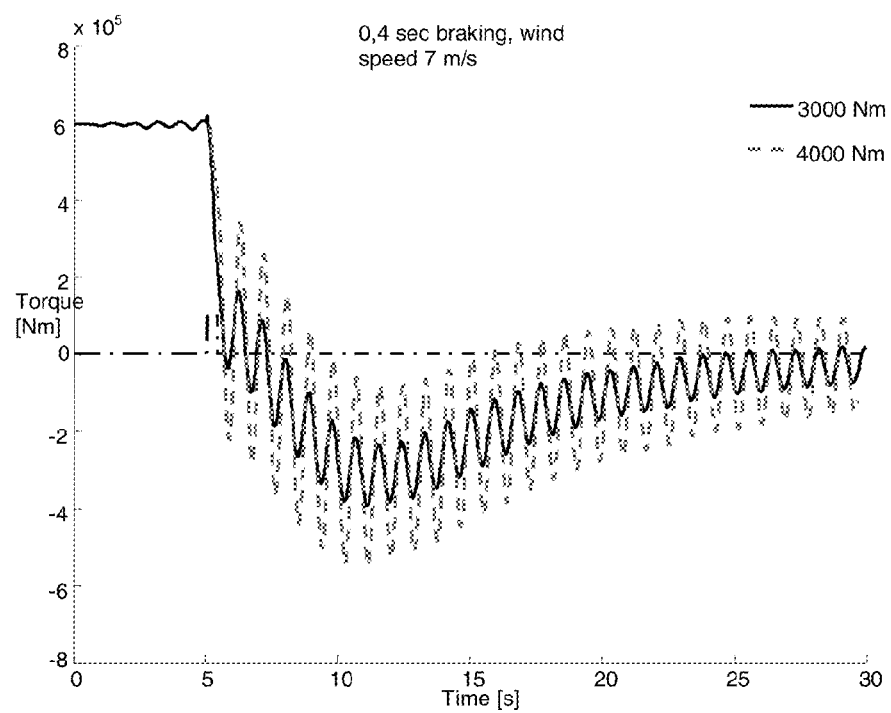
Figure 8:
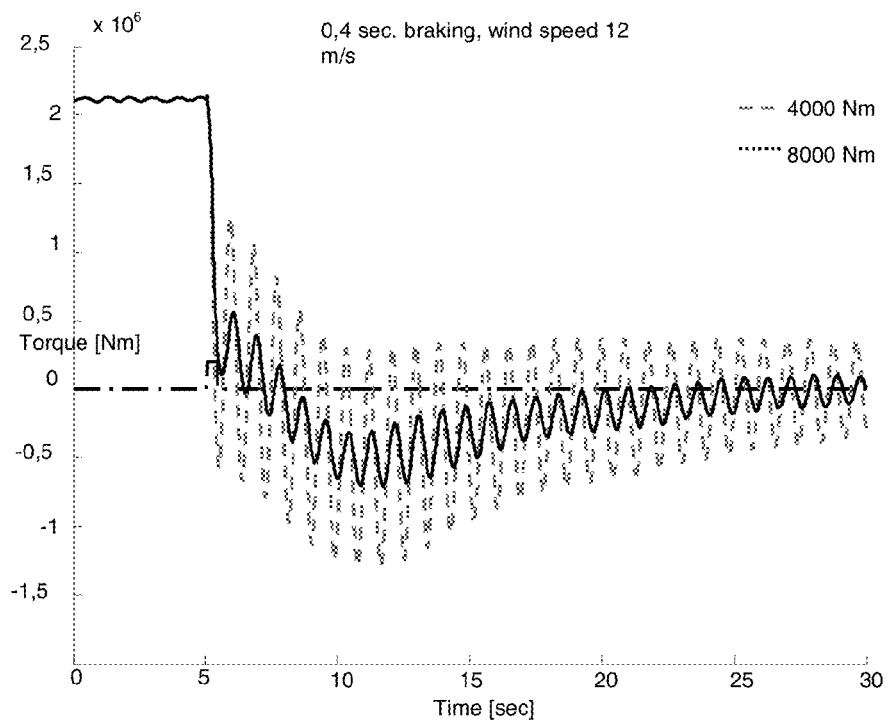

FIG. 7 simulation of torsional oscillations in the rotor shaft after grid loss at a wind speed of 7 m/s for different braking torques, both applying the method according to the present invention FIG. 8 simulation of torsional oscillations in the rotor shaft after grid loss at a wind speed of 12 m/s for different braking torques, both applying the method according to the present invention With reference to FIG. 1, a schematic drawing of a wind turbine is shown. The rotor 10 comprises a plurality of blades. The blades are mounted on the rotor shaft (also: slow speed shaft) 12. The gearbox 11 transforms the rotary motion of the rotor shaft into rotary motion of the high speed shaft 13. A brake disc 14 is mounted on the high speed shaft. A hydraulic brake is indicated with reference sign 15. In this figure, a possible embodiment of the braking system that can be used in the method according to the present invention is shown. In principle however, any form of brake could be applied in the method according to the invention.

The high speed shaft 13 sets the rotor of the generator 16 into motion. The electricity generated by the generator is supplied into the electrical grid 18, through suitable electrical components, generally indicated with reference sign 17. Reference sign 19 indicates a pitch system of the blades, which can rotate the blades along their longitudinal axis. In the method according to the present invention, a pitch system is not necessary. It is however preferable to have one.

FIG. 2 shows the results of a simulation of the torsional oscillation in the power train of a wind turbine. A grid loss occurs at t=5. The prevailing wind speed at the moment grid loss occurs is 7 m/s. The torsional oscillations in the power train are shown for two different cases. In the first case (dotted line in FIG. 2), no braking torque is applied, i.e. the brake is not activated. It can be seen that the torsional oscillations are of a high magnitude and the oscillations only die out very gradually. In the second case (continuous line in FIG. 2), a braking torque is applied for a period of 0.4 seconds, with a delay after grid loss of 0.05 seconds. The brake is preferably applied as soon as possible after the grid loss. The delay of 0.05 seconds was used in the simulation, since it was estimated to be the minimum reaction time of the braking system.

For the method according to the invention, the period of braking does not necessarily have to be 0.4 seconds. Advantageous results can also be achieved with different periods of braking (falling within the scope of the claims).

It can be seen in FIG. 2 that applying the braking torque for a single short period of time reduces the magnitude of torsional oscillations significantly. Additionally, and as a result of this, the torsional oscillations die out sooner.

FIG. 3 shows the results of the same simulation as in FIG. 2, but shows a more detailed view of the first 2 seconds after grid loss occurs.

FIGS. 4 and 5 show similar simulations, but at a wind speed of 12 m/s. Also here, grid loss occurs at t=5, a braking period of 0.4 seconds is applied after a delay of 0.05 seconds. Similar results are obtained. Applying the method according to the invention the torsional oscillations are reduced. Comparing the results of FIGS. 4 and 5 with those of FIGS. 2 and 3, it is clear that the magnitude of the torsional oscillations is higher at a wind speed of 12 m/s than at a wind speed of 7 m/s.

FIG. 6 shows the torsional oscillations when grid loss occurs at a wind speed of 25 m/s. Once more, the achievable reduction in torsional oscillations (continuous line in FIG. 6) using the method according to the invention is shown.

The resulting torsional oscillations at different wind speeds vary in magnitude. At higher wind speeds, the torsional oscillations are greater and thus the potential damage to the power train components is also greater. If cost reduction is the most important objective, it can therefore be chosen to implement the method of braking only if the grid loss occurs at a moment of high prevailing wind speed. If grid loss occurs at lower wind speeds, the brakes would not be activated and the torsional oscillations would continue for a longer time. This could in certain cases be regarded as acceptable.

If this is not regarded as acceptable however, the braking method could be implemented at any occurrence of grid loss, both at high and at low wind speeds.

FIG. 7 shows the results of a simulation of torsional oscillations in the power train after grid loss at a wind speed of 7 m/s for different braking torques, both applying the method according to the present invention. From this figure it can be seen that the most advantageous results are not necessarily achieved applying the greatest braking torque. The torsional oscillations are reduced if a braking torque of 3000 N·m is applied compared to when a braking torque of 4000N·m is applied.

FIG. 8 shows the results of a simulation of torsional oscillations in the power train after grid loss at a wind speed of 12 m/s for different braking torques, both applying the method according to the present invention.

FIGS. 7 and 8 show that in applying the method according to the invention, a certain optimum braking torque exists. Increasing the braking torque beyond this optimum increases the torsional oscillations with respect to the optimum situation. It is preferable in the method according to the invention to determine the braking torque taking the wind speed into account. It is more preferable to take the aerodynamic torque acting on the rotor at the moment of grid loss into account to determine the optimum braking torque.

The invention claimed is:

1. A method of reducing torsional oscillations in the power train of a wind turbine in the event of grid loss wherein, after the grid loss a braking torque is applied to the power train during a period of time, said period of time being determined as a function of the torsional resonance frequency of the power train.

2. A method of reducing torsional oscillations according to claim 1, wherein said period of time is also determined as a function of the delay occurring between the moment of the grid loss and the moment of applying the braking torque.

3. A method of reducing torsional oscillations according to claim 1, wherein the braking torque is applied substantially immediately after the grid loss occurs.

4. A method of reducing torsional oscillations according to claim 2, wherein said period of time is determined to be between 50% and 100% of a maximum allowable period, said maximum allowable period being determined as half the torsional resonance period of the power train minus the delay occurring between the moment of the grid loss and the moment of applying the braking torque.

5. A method of reducing torsional oscillations according to claim 4, wherein said period of time is determined to be between 70% and 100%, and preferably between 80% and 100% of said maximum allowable period.

6. A method of reducing torsional oscillations according to claim 1, wherein said time period is approximately 0.4 seconds.

7. A method of reducing torsional oscillations according to claim 1, wherein
the braking torque is applied during a single time period.

8. A method of reducing torsional oscillations according to claim 1, wherein
the braking torque that is applied to the power train is determined by taking into account the wind speed at the moment of the grid loss.

9. A method of reducing torsional oscillations according to claim 8, wherein
the braking torque that is applied to the power train is determined by taking into account the aerodynamic torque acting on the rotor at the moment of the grid loss.

10. A method of reducing torsional oscillations according to claim 1, wherein the braking torque that is applied to the power train is determined by taking into account the electrical power generated by the generator at the moment of the grid loss.

11. A method of reducing torsional oscillations according to claim 8, wherein
the braking torque that is applied to the power train is determined by also taking into account the delay occurring between the moment of the grid loss and the moment of applying the braking torque, and the period of braking.

12. A method of reducing torsional oscillations according to claim 1, wherein the braking torque is only applied if the grid loss occurs at a wind speed above a predetermined minimum wind speed.

13. A method of reducing torsional oscillations according to claim 1, wherein the braking torque is applied regardless of the prevailing wind speed at the grid loss.

14. A method of reducing torsional oscillations according to claim 1, wherein a pitch control system of the wind turbine blades is also activated substantially immediately following the grid loss, so that after the brake has been released, pitch control of the rotor blades is used to further slow down the wind turbine.

15. A method of reducing torsional oscillations according to claim 1, wherein the braking torque acts on the high speed shaft of the power train.

* * * * *